US012663658B2

(12) United States Patent
Brauneck et al.

(10) Patent No.: US 12,663,658 B2
(45) Date of Patent: Jun. 23, 2026

(54) PARTIAL BEAM SPLITTER, STACK COMPRISING TWO OR MORE SUCH PARTIAL BEAM SPLITTERS AND METHOD OF MANUFACTURING SUCH A PARTIAL BEAM SPLITTER

(71) Applicants: SCHOTT AG, Mainz (DE); SCHOTT Suisse SA, Yverdon-les-Bains (CH)

(72) Inventors: Ulf Brauneck, Yverdon-les-Bains (CH); Clemens Ottermann, Hattersheim (DE); Frank-Thomas Lentes, Bingen (DE); Frank Wolff, Mainz (DE); Stefan Weidlich, Mainz (DE)

(73) Assignees: SCHOTT AG, Federal Republic of (DE); SCHOTT Suisse SA, Yverdon-les-Bains (CH)

( * ) Notice: Subject to any disclaimer, the term of this patent is extended or adjusted under 35 U.S.C. 154(b) by 327 days.

(21) Appl. No.: 18/478,062

(22) Filed: Sep. 29, 2023

(65) Prior Publication Data

US 2024/0118553 A1     Apr. 11, 2024

(30) Foreign Application Priority Data

Sep. 30, 2022   (DE) .......................... 102022125385.6
Oct. 21, 2022   (DE) .......................... 102022127902.2

(51) Int. Cl.
   *G02B 27/14*      (2006.01)
   *G02B 27/12*      (2006.01)
(52) U.S. Cl.
   CPC ........... *G02B 27/142* (2013.01); *G02B 27/12* (2013.01)

(58) Field of Classification Search
   None
   See application file for complete search history.

(56) References Cited

U.S. PATENT DOCUMENTS

| | | | | |
|---|---|---|---|---|
| 4,627,688 | A * | 12/1986 | Kobayashi ........... | G02B 27/283 359/884 |
| 5,400,179 | A * | 3/1995 | Ito ........................... | G02B 5/26 359/359 |
| 7,012,751 | B2 | 3/2006 | Theuss | |
| 10,324,031 | B2 | 6/2019 | Mitchell et al. | |
| 2009/0316267 | A1 * | 12/2009 | Chan .................... | G02B 27/283 359/359 |

(Continued)

*Primary Examiner* — Sharrief I Broome
*Assistant Examiner* — Journey F Sumlar
(74) *Attorney, Agent, or Firm* — TAYLOR & EDELSTEIN, PC

(57)      ABSTRACT

A partial beam splitter includes a substrate including a substrate material; and a coating arranged on at least one main surface of the substrate. Along a first direction which is parallel to a normal vector of the main surface, the substrate and all coatings having a total thickness. For a specific light beam having a specific wavelength within a range of 450 nm and 650 nm which is incident on the partial beam splitter along a second direction with an angle of 32° enclosed between a vector pointing in the first direction and a vector pointing in the second direction, the specific light beam after transmitting through the partial beam splitter has a phase having a phase difference of an absolute value of smaller than or equal to 30° compared to the case in which, under otherwise identical conditions, the partial beam splitter is replaced by a similar reference substrate.

24 Claims, 3 Drawing Sheets

(56) References Cited

U.S. PATENT DOCUMENTS

| | | | | |
|---|---|---|---|---|
| 2010/0296165 A1* | 11/2010 | Tan | ........................... | G02B 6/43 |
| | | | | 359/583 |
| 2011/0019285 A1* | 1/2011 | Kuo | ................... | G02B 27/0025 |
| | | | | 359/637 |
| 2013/0038933 A1* | 2/2013 | Wang | ................... | G02B 27/283 |
| | | | | 29/458 |
| 2016/0216524 A1* | 7/2016 | Deng | ................. | G02B 27/0172 |
| 2022/0077642 A1 | 3/2022 | Reichmann | | |

* cited by examiner

50

100

PARTIAL BEAM SPLITTER, STACK COMPRISING TWO OR MORE SUCH PARTIAL BEAM SPLITTERS AND METHOD OF MANUFACTURING SUCH A PARTIAL BEAM SPLITTER

CROSS REFERENCE TO RELATED APPLICATIONS

This application claims priority to German Patent Application No. 10 2022 127 902.2 filed on Oct. 21, 2022, which is incorporated in its entirety herein by reference. This application also claims priority to German Patent Application No. 10 2022 125 385.6 filed on Sep. 30, 2022, which is incorporated in its entirety herein by reference.

BACKGROUND OF THE INVENTION

1. Field of the Invention

The present invention relates to a partial beam splitter and a method of manufacturing such a partial beam splitter. The present invention also relates to a stack comprising two or more such partial beam splitters.

2. Description of the Related Art

In reflective augmented reality waveguides, light from a projector coupled into the waveguide is internally directed, modified or reflected out of the waveguide and into a user's eye by one or more partial beam splitters. However, with conventional waveguides, the quality of the image presented to the user is often less than optimal due to low contrast and reduced sharpness.

What is needed in the art is a way to overcome the disadvantages described above and to provide a way to improve the quality of the respective images presented to the user.

SUMMARY OF THE INVENTION

In some embodiments provided according to the invention, a partial beam splitter includes a substrate made of a substrate material and at least one coating arranged on at least one main surface of the substrate. Along a first direction which is parallel to a normal vector of the main surface, the substrate and all coatings having a total thickness. For a specific light beam having a specific wavelength within a range of 450 nm and 650 nm which is incident on the partial beam splitter along a second direction with an angle of 32° enclosed between a vector pointing in the first direction and a vector pointing in the second direction, the specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, a stack includes two or more partial beam splitters. Each of the partial beam splitters includes a substrate made of a substrate material and at least one coating arranged on at least one main surface of the substrate. Along a first direction which is parallel to a normal vector of the main surface, the substrate and all coatings having a total thickness. For a specific light beam having a specific wavelength within a range of 450 nm and 650 nm which is incident on the partial beam splitter along a second direction with an angle of 32° enclosed between a vector pointing in the first direction and a vector pointing in the second direction, the specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
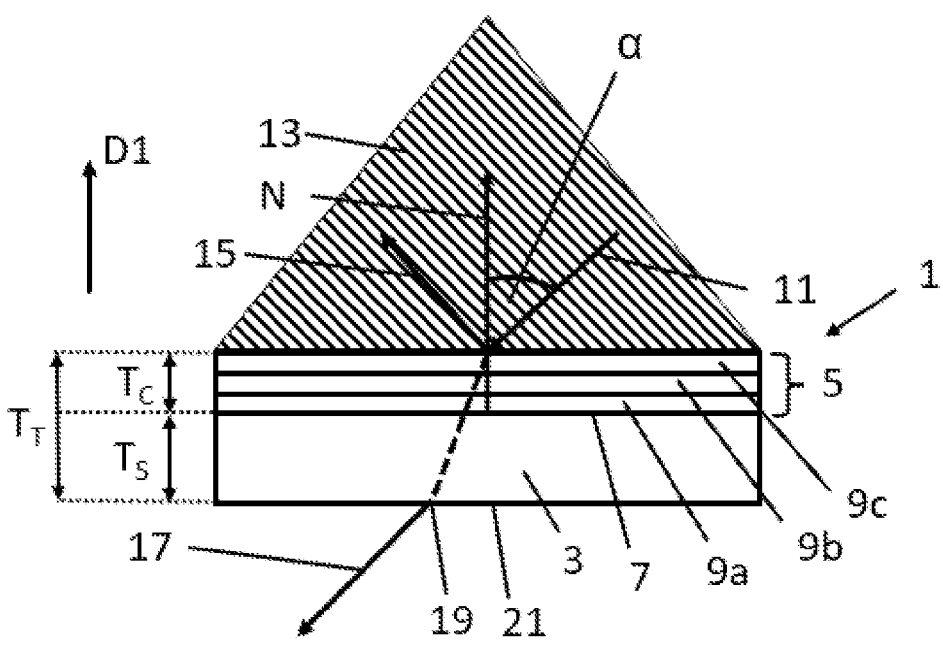
FIG. 1A shows a schematic drawing of a partial beam splitter provided according to the invention.

In some embodiments provided according to the invention, a partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength within the range of 450 nm and 650 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, the partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength within the range of 500 nm and 600 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, the partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength of 525 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, the partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength of 546 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, the partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength of 587 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, the partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength of 525 nm or 546 nm or 587 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

In some embodiments provided according to the invention, the partial beam splitter comprises a substrate made of a substrate material and at least one coating arranged on at least one main surface of the substrate, wherein along a first direction which is parallel to the normal vector of the main surface, the substrate and all coatings have a total thickness, and wherein for a specific light beam having a specific wavelength of 525 nm and 546 nm and 587 nm which is incident on the partial beam splitter along a second direction with an angle of 32° enclosed between a vector pointing in said first direction and a vector pointing in said second direction, said specific light beam after transmitting through the partial beam splitter has a phase having a phase difference of an absolute value of smaller than or equal to 30° compared to the case in which, under otherwise identical conditions, the partial beam splitter is replaced by a reference substrate made of the substrate material and having a thickness identical to the total thickness of the partial beam splitter.

It is, thus, the surprising finding that controlling the phase of the transmitted light beam allows significant improvement of the quality of the image when respective partial beam splitters are used in reflective augmented reality waveguides.

The inventors believe that the minor differences in the propagation paths of the plurality of light beams which are emitted by the projector for different colors and/or different pixels of the image to be presented and which light beams are mixed in the user's eye are less critical if the phase difference is controlled as stated for the light beams which are transmitted through the partial beam splitters.

Thus, if for a respective angle of incidence of 32° and for a respective specific wavelength of the specific light beam a respective phase difference is set up, the partial beam splitter can be used for providing high quality images to a user.

In addition, optionally the structures of the partial beam splitter are not substantially affecting the appearance of the user's eye to some third person when used in an AR (augmented reality) device such as AR glasses. Generally, the appearance of the user's eye to a third person might be affected by the antireflective effect of the coating in the direction of the line of sight between the user's eye and the third person. It may therefore be preferred if in the angular range, where the AR-picture is guided, the reflection is higher than in the angular range, where the user looks through the partial beam splitter to the outside world. For example, the main propagation direction of the light, especially the transmitted part of the light, (such as the specific light beam) within the partial beam splitter may be chosen such that it is different, especially perpendicular to the direction of the line of sight between the user's eyes and the third person.

Optionally it is clear to the person skilled in the art that the phase difference is evaluated between (1.) the specific light beam that has transmitted through the partial beam splitter and (2.) the specific light beam that has, under otherwise identical conditions, transmitted through the reference substrate which has a thickness corresponding to the total thickness of the partial beam splitter.

Optionally, the specific light beam is incident on the partial beam splitter at a first surface of the partial beam splitter, such as a first main surface of the partial beam splitter. In particular, the first surface of the partial beam splitter is an outer surface of the coating. Optionally, for evaluating the phase difference, the transmitted portion of the specific light beam at a second surface of the partial beam splitter, such as a second main surface of the partial beam splitter is used. In particular, the second surface of the partial beam splitter is an outer surface of the partial beam splitter facing in the opposite direction than the outer surface of the coating.

Likewise, for the reference substrate, the specific light beam is incident on the reference substrate at a first surface of the reference substrate, such as a first main surface of the reference substrate. In particular, the first surface of the reference substrate is an outer surface and/or a main surface of the reference substrate. Optionally, for evaluating the phase difference, the transmitted portion of the specific light beam at a second surface of the reference substrate, such as a second main surface of the reference substrate is used. In particular, the second surface of the reference substrate is an outer surface and/or a main surface of the reference substrate facing in the opposite direction than the other outer surface of the reference substrate.

The term "variable X is between Y and Z" when used in this application optionally means that variable X can take any value which is between Y and Z, inclusive Y and Z. For example, the variable X may take the value Y, the value Z or any value which is in between.

The specific light beam optionally is incident on the partial beam splitter at a coupling point, which optionally is within the first main surface of the partial beam splitter and/or leaves the partial beam splitter at an exit point which optionally is within the second main surface of the partial beam splitter.

The phase difference can be measured using optical analysis. In the optical analysis, the angle of 32° enclosed between said first direction and said second direction (i.e. the angle of incidence) can be measured for the specific light beam propagating within an incident medium (which optionally is provided by means of and/or in form of a coupling element), which is made of the same material as the substrate. Optionally, the incident medium is directly or indirectly (e.g. via an adhesive layer) attached to the partial beam splitter. The incident medium could be, for example, in form of a prism. Optionally, the second direction is the direction of the propagation path of the specific light beam within the coupling element.

Optionally the reference wavefront for the phase difference is the wavefront which starts propagating from the coupling element.

It turned out that in principle for higher angles of incident higher phase differences might be accepted while still obtaining a high-quality image. Of course, when the partial beam splitter is in use, the partial beam splitter optionally allows to be used over a wide range of angles of incidence. However, if for the stated angle of incidence the phase difference fulfills the maximum threshold criterion, it turned out that such a partial beam splitter is highly preferred.

Optionally, the maximum threshold criterion is fulfilled for angles of incidence in the range between 3° and 80°, especially between 10° and 70°, especially between 10° and 50° or between 10° and 40° or between 30° and 50° or between 40° and 60°.

Optionally, the first direction is also parallel to the normal vector of the main surface of the partial beam splitter. The angle of incidence is then optionally stated with respect to that normal vector.

The relation between the angle of incidence, the specific wavelength of the specific light beam and the maximal phase difference allowed for the phase difference can optionally define a figure of merit. Hence, in some embodiments, the partial beam splitter fulfills the maximal phase difference criterion for the specific light beam (which is incident under the angle of incidence and which has a wavelength according to the specific wavelength).

For example, the substrate is made of glass ceramics, glass, optical polymers and/or ceramics. In some embodiments, the substrate is made of a material which is transparent, at least for a wavelength in the range of 450 nm and 650 nm and/or the specific wavelength.

Optionally the partial beam splitter is designed so that a light beam according to the specific light beam is partially reflected by and partially transmitted through the partial beam splitter. The specific light beam incident on the partial beam splitter is, hence, split up in at least two partial light beams.

The specific light beam incident on the partial beam splitter, the reflected light beam and the transmitted light beam optionally propagate in a common propagation plane. Especially the angle between the first and second directions is measured within this common propagation plane.

In some embodiments the phase difference fulfills the maximum threshold criterion for each specific wavelength in the stated range. In other words, the figure of merit is not only for (at least) one single wavelength chosen as specific wavelength fulfilled but for every wavelength within the stated range.

As an alternative to an optical analysis of the phase difference, the composition of substrate material and any coatings on a given partial beam splitter can be analysed using ToF-SIMS and/or FIB-SIMS. The thicknesses of substrates and coating layers can be determined by electron microscopy. Finally, the phase difference can be calculated from the refractive indexes of the coating and substrate materials.

The analysis methods (such as ToF-SIMS and/or FIB-SIMS) allow identification of the materials and the thicknesses of the coating layers. Refractive index information can be obtained experimentally or derived from existing databases. Based on this information the optical properties of the coatings like spectral and angular transmittance, reflectance, phase and retardance may be evaluated for a light beam incidence on the partial beam splitter.

Optionally, of course, the total thickness of the partial beam splitter (especially measured along the first direction) is identical to the total thickness of the substrate and all coatings (especially respectively measured along the first direction).

Optionally, the maximal phase difference criterion is fulfilled for the partial beam splitter having a temperature of between 0° C. and 60° C., such as 20° C. (e.g. the ambient temperature may be within this range). In other words, the phase difference for the partial beam splitter optionally is evaluated while it has a temperature within said temperature range. It is, therefore, possible that for a light beam having an angle of incidence of 32° and the specific wavelength the phase difference which is evaluated is larger than 30° if the partial beam splitter has a temperature outside of the stated range.

It is clear for the person skilled in the art that the partial beam splitter has optionally a defined reflectivity and/or a defined transmittivity for the specific light beam incident thereon. The coating (in combination with the substrate) has the beneficial effect that a partial reflection of the specific light beam can be achieved while at the same time the phase of the specific light beam after transmission through the partial beam splitter can be controlled in a precise manner.

Optionally, the term "main surface" (of an element) may be understood as one of the main surfaces with the largest surface. An element may have more than one main surface. For example, a substrate, such as the substrate of the partial beam splitter, may have two main surfaces (which are parallel to each other). For example, the partial beam splitter may have two main surfaces, with one main surface of those being an outer surface of the coating.

In some embodiments it might be alternatively or in addition preferred the specific wavelength is between 500 nm and 600 nm, especially is 525 nm, 546 nm or 587 nm. A wavelength selected from this range is beneficial because they are well suited for augmented reality applications. For example, the specific wavelength might be between 500 nm and 550 nm or between 550 nm and 600 nm.

In some embodiments it might be alternatively or in addition preferred that the phase difference has an absolute value which is smaller than or equal to 20°, smaller than or equal to 15°, smaller than or equal to 10°, smaller than or equal to 7°, smaller than or equal to 5°, smaller than or equal to 3°, or smaller than or equal to 1°.

In some embodiments it might be alternatively or in addition preferred that the phase difference has an absolute value which is larger than or equal to 0.5°, larger than or equal to 1°, larger than or equal to 2°, or larger than or equal to 5°.

Optionally the absolute value of the phase difference is larger than or equal to 10° and smaller than or equal to 30°. This is a trade-off between higher manufacturing costs and improvements in the image quality.

In some embodiments it might be alternatively or in addition preferred that the coating has at least two layers and/or between 1 and 5000 layers, between 2 and 50 layers, between 5 and 40 layers, or between 7 and 35 layers.

If the coating is a multi-layer coating, it is possible to selectively improve the image quality for a particular wavelength or a particular range of wavelengths.

The refractive index of the coating can be adjusted in a precise manner by combining—if there is not a coating with suitable index—one or more layers with low and one or more layers with high refractive index to achieve the target refractive index of the coating.

Optionally, the main surfaces of all layers of the coating are parallel to each other and/or to the man surface of the substrate.

Optionally, the absolute value of the difference between the minimum refractive index of one of the layers and the maximum refractive index of one of the layers is 1.0 or smaller, optionally 0.70 or smaller, optionally 0.50 or smaller, optionally 0.30 or smaller, optionally 0.10 or smaller, optionally 0.05 or smaller, optionally 0.01 or smaller, especially for a wavelength of 587 nm and/or for the specific wavelength.

Optionally the refractive index of each layer is between 1.1 and 2.5, especially for a wavelength of 587 nm and/or for the specific wavelength.

In some embodiments it might be alternatively or in addition preferred that a thickness of each layer of the coating along the first direction is larger than or equal to 1 nm, larger than or equal to 4 nm, larger than or equal to 8 nm, larger than or equal to 10 nm, or larger than or equal to 15 nm; and/or is smaller than or equal to 5000 nm, smaller than or equal to 3000 nm, smaller than or equal to 2000 nm, smaller than or equal to 1000 nm, or smaller than or equal to 500 nm; and/or is between 1 nm and 5000 nm, between 4 nm and 3000 nm, between 8 nm and 2000 nm, between 10 nm and 1000 nm, or between 15 nm and 500 nm.

Respective thicknesses can be produced with well-known techniques which might keep the manufacturing costs low.

Optionally, the thickness of each layer whose refractive index is close to the refractive index of the substrate (e.g. the refractive index of the layer is from 90% to 110% of the refractive index of the substrate) is from 100 nm to 300 nm, the thickness of each layer whose refractive index is high (e.g. higher than 110% of the refractive index of the substrate) is from 10 nm to 25 nm and/or the thickness of each layer whose refractive index is low (e.g. smaller than 90% of the refractive index of the substrate) is from 50 nm to 200 nm.

In some embodiments, at least one layer of the coating is a dielectric layer, especially all layers of the coating are dielectric layers, and/or at least one layer of the coating, especially the at least one layer having a thickness along the first direction of 10 nm or less, consists of and/or comprises metal, such as Ag, and/or the coating has no layers made of and/or comprising metal.

For a dielectric layer the optical properties of the respective layer can be advantageously controlled. This in turn allows producing well-defined coatings with respect to specific demands for optical properties such as reflectivity and transmittivity.

A metal-free coating is particularly beneficial for the use as partial beam splitter.

In some embodiments it might be alternatively or in addition preferred that the coating has at least one spatially variable index layer or is made of one single spatially variable index layer.

A spatially variable index layer is easy to produce with convenient techniques but turned out to provide beneficial results with respect to controlling the phase of the specific light beam. A spatially variable index layer may be realized in form of a rugate design.

A spatially variable index layer in the sense of the present application may be a layer which has a refractive index which changes, especially increases and/or decreases, along the first direction, especially in sections.

Alternatively or in addition to a spatially variable index layer also a gradient filter might be used.

In some embodiments it might be alternatively or in addition preferred that the coating is at least partially applied to the substrate by sputtering.

The process of sputtering can be controlled in a precise manner so that it is beneficial used for applying the coating (or at least one or more of the multiple layers of the coating) to the substrate.

Alternatively, PVD (physical vapor deposition), CVD (chemical vapor deposition), PICVD (plasma-impulse CVD) or ALD (atomic layer deposition) might be used for applying the coating on the substrate.

In some embodiments it might be alternatively or in addition preferred that at least one layer of the coating constitutes a matching layer, and wherein optionally:

(i) the matching layer has a refractive index and/or an optical dispersion essentially corresponding to the refractive index and/or the dispersion pattern, respectively, of the substrate;

(ii) the ratio of the refractive index of the matching layer and the refractive index of the substrate is between 0.9 and 1.1;

(iii) the matching layer has a thickness of between 200 nm and 400 nm;

(iv) the matching layer is arranged directly on the substrate, in particular by deposition and/or as an adhesive layer;

(v) two or more layers of the coating each constitute a matching layer; and/or (vi) the total thickness of all matching layers of the coating is larger than the thickness of each of the other layers of the coating.

The matching layer allows matching the phase properties of the coating to those of the substrate. The position in the coating stack may be variable, as well as the thickness and the refractive index of the matching layer may be subject to design options.

The matching layer does not have to be arranged directly on the substrate. Its position in the coating (e.g. along the first direction) may be determined by reflectance and chromaticity conditions.

It may be preferred that the matching layer has an identical or similar refractive index than the substrate material. It turned out that in this way it is possible to obtain a partial beam splitter while at the same time controlling the phase is possible.

Especially, the matching layer may be used to control the phase of the specific light beam while the other layers of the coating may be used for controlling the reflectivity and/or transmittivity of the partial beam splitter and/or of the coating.

The total thickness of all matching layers may be measured along the first direction. Likewise, also the thickness of each of the other layers of the coating may be measured along the first direction.

Optionally, the coating has at least two layers and one of those layers is the matching layer.

The matching layer might be realized in form of a spatially variable index layer.

In some embodiments the coating is identical to one single matching layer.

The values of the refractive indexes of the matching layer and the substrate optionally are identical if the ratio of the refractive index of the matching layer and the refractive index of the substrate is between 0.95 and 1.05.

Optionally, the absolute value of the difference between the refractive index of the matching layer and the refractive index of the substrate is 0.1 or smaller, optionally 0.05 or smaller, optionally 0.02 or smaller, optionally 0.01 or smaller.

For example, the thickness of the matching layer, in some embodiments, is from 50 nm to 200 nm, such as from 50 nm to 100 nm or from 100 nm to 200 nm.

Optionally the two refractive indexes (of the substrate material and the matching layer) as indicated in this disclosure relate to a wavelength of 587 nm (i.e. refractive index $n_d$) and/or the specific wavelength.

In some embodiments, the matching layer:

(i) comprises $SiO_2$ and/or $Al_2O_3$, in particular in combination with an alkaline earth oxide containing flint glass as a substrate material; and/or (ii) is made of $SiO_2$, in particular in combination with a boron containing crown glass as a substrate material.

In some embodiments, the material of the matching layer may be mixed materials of highly refractive materials (e.g. $Ta_2O_5$) and low refractive materials (e.g. $SiO_2$), such as a mixture of $Al_2O_3$ and $SiO_2$.

In some embodiments, the substrate material is or comprises a glass, such as a silicate glass, e.g. a barium containing silicate glass. For example, the substrate material may comprise or consist of a flint glass or a crown glass. Optionally, the glass is selected from an alkaline earth oxide containing flint glass, a barium flint glass, a barium crown glass, a boron containing crown glass, a lanthanum flint glass, a lanthanum crown glass, and combinations thereof. It turned out that respective materials, especially combination of materials, allow production of a particular well-suited transition between the coating and the substrate for the specific light beam.

Optionally, the coating may comprise or consist of one or more components selected from one or more oxides, one or more fluorides, one or more nitrides, one or more sulfides, one or more selenides, one or more metals, and combinations of two or more thereof. For example, the coating may comprise or consist of one or more components selected from one or more metal oxides, one or more metal fluorides, one or more metal nitrides, one or more metal sulfides, one or more metal selenides and combinations of two or more thereof. The oxide may be selected from silicon oxide, aluminum oxide, hafnium oxide, tantalum oxide, niobium oxide, titanium oxide, zirconium oxide, yttrium oxide, praseodymium oxide, scandium oxide, tin oxide, chromium oxide, indium oxide and combinations of two or more thereof. Optionally, the combination of two or more oxides is a mixed oxide. The fluorides may be selected from aluminum fluoride, magnesium fluoride, neodymium fluoride, lanthanum fluoride, yttrium fluoride, gadolinium fluoride, ytterbium fluoride and combinations of two or more thereof. The nitrides may be selected from aluminum nitride, silicon nitrides and combinations thereof. The sulfides may include zinc sulfide. The selenides may include zinc selenide. The metals may be selected from aluminum, silver, gold, chromium, nickel and combinations thereof. Optionally, the combination of two or more metals is an alloy. Optionally, any metal layer should have a thickness along the first direction of 10 nm or lower to provide for sufficient transparency. Optional mixed oxides are selected from oxides of aluminum and praseodymium, aluminum and lanthanum, aluminum and tantalum, praseodymium and titanium, zirconium and titanium, lanthanum and titanium as well as niobium and titanium.

Optionally, the coating may comprise at least one layer comprising or consisting of one or more components selected from one or more oxides, one or more fluorides, one or more nitrides, one or more sulfides, one or more selenides, one or more metals, and combinations of two or more thereof. For example, the layer may comprise or consist of one or more components selected from one or more metal oxides, one or more metal fluorides, one or more metal nitrides, one or more metal sulfides, one or more metal selenides and combinations of two or more thereof. The oxide may be selected from silicon oxide, aluminum oxide, hafnium oxide, tantalum oxide, niobium oxide, titanium oxide, zirconium oxide, yttrium oxide, praseodymium oxide, scandium oxide, tin oxide, chromium oxide, indium oxide and combinations of two or more thereof. Optionally, the combination of two or more oxides is a mixed oxide. The fluorides may be selected from aluminum fluoride, magnesium fluoride, neodymium fluoride, lanthanum fluoride, yttrium fluoride, gadolinium fluoride, ytterbium fluoride and combinations of two or more thereof. The nitrides may be selected from aluminum nitride, silicon nitrides and combinations thereof. The sulfides may include zinc sulfide. The selenides may include zinc selenide. The metals may be selected from aluminum, silver, gold, chromium, nickel and combinations thereof. Optionally, the combination of two or more metals is an alloy. Optionally, any metal layer should have a thickness along the first direction of 10 nm or lower to provide for sufficient transparency. Optional mixed oxides are selected from oxides of aluminum and praseodymium, aluminum and lanthanum, aluminum and tantalum, praseodymium and titanium, zirconium and titanium, lanthanum and titanium as well as niobium and titanium.

Optionally, one or more matching layers may comprise or consist of one or more components selected from one or more oxides, one or more fluorides, one or more nitrides, one or more sulfides, one or more selenides, one or more metals, and combinations of two or more thereof. For example, the layer may comprise or consist of one or more components selected from one or more metal oxides, one or more metal fluorides, one or more metal nitrides, one or more metal sulfides, one or more metal selenides and combinations of two or more thereof. The oxide may be selected from silicon oxide, aluminum oxide, hafnium oxide, tantalum oxide, niobium oxide, titanium oxide, zirconium oxide, yttrium oxide, praseodymium oxide, scandium oxide, tin oxide, chromium oxide, indium oxide and combinations of two or more thereof. Optionally, the combination of two or more oxides is a mixed oxide. The fluorides may be selected from aluminum fluoride, magnesium fluoride, neodymium fluoride, lanthanum fluoride, yttrium fluoride, gadolinium fluoride, ytterbium fluoride and combinations of two or more thereof. The nitrides may be selected from aluminum nitride, silicon nitrides and combinations thereof. The sulfides may include zinc sulfide. The selenides may include zinc selenide. The metals may be selected from aluminum, silver, gold, chromium, nickel and combinations thereof. Optionally, the combination of two or more metals is an alloy. Optionally, any metal layer should have a thickness along the first direction of 10 nm or lower to provide for sufficient transparency. Optional mixed oxides are selected from oxides of aluminum and praseodymium, aluminum and lanthanum, aluminum and tantalum, praseodymium and titanium, zirconium and titanium, lanthanum and titanium as well as niobium and titanium.

Optionally, the coating may comprise a layer having a first oxide and a further layer having a second oxide, the first and second oxides being the same or different. In some embodiments, the coating has at least 3 layers, at least 4 layers, at least 6 layers or at least 8 layers. By choosing the appropriate material for the various layers, optical properties can be matched as desired. For example, the coating may comprise $Ta_2O_5$ and/or $SiO_2$ (especially in combination with a boron containing crown glass as a substrate material). Also, optionally the coating may comprise layers of respectively $Ta_2O_5$, $SiO_2$ and/or $Al_2O_3$ and/or a matching layer which comprises $SiO_2$ and $Al_2O_3$ (especially in combination with an alkaline earth oxide containing flint glass as a substrate material). Also optionally, the coating may comprise layers of hafnium oxide ($HfO_2$) and $SiO_2$, wherein, in some embodiments, the thickness of the hafnium oxide ($HfO_2$) layer is smaller than the thickness of the $SiO_2$ layer. Also optionally, the coating may comprise layers of $Ta_2O_5$ and $SiO_2$, wherein, in some embodiments, the thickness of the $Ta_2O_5$ layer is smaller than the thickness of the $SiO_2$ layer (which may be from 78 nm to 230 nm). The material of the coating can be selected based on the desired refractive index or dispersion properties.

In some embodiments it might be alternatively or in addition preferred that a thickness of the coating along the first direction is larger than or equal to 500 nm, larger than or equal to 800 nm, larger than or equal to 1000 nm, larger than or equal to 1500 nm, or larger than or equal to 2000 nm; and/or is smaller than or equal to 3000 nm, smaller than or equal to 2000 nm, smaller than or equal to 1500 nm, smaller than or equal to 1000 nm, or smaller than or equal to 700 nm; and/or is between 500 nm and 3000 nm, between 500 nm and 2000 nm, between 700 nm and 1500 nm, between 1000 nm and 1400 nm, or between 1100 nm and 1300 nm, especially about 1200 nm.

Respective thicknesses can be produced with well-known techniques which might keep the manufacturing costs low.

In some embodiments it might be alternatively or in addition preferred that a refractive index of the coating is 1.45 or larger, 1.47 or larger, 1.50 or larger, 1.51 or larger, or 1.60 or larger; and/or is 3.00 or smaller, 2.50 or smaller, 2.00 or smaller, or 1.80 or smaller.

Choosing a respective refractive index of the coating turned out to be particularly beneficial for improving the image quality. Especially it turned out that adapting the refractive index of the coating as whole, rather than for each and every layer of the coating individually, is sufficient to obtain high quality images.

Optionally the refractive index of the coating is an average refractive index of the coating. For example, the values of the refractive index stated above for the coating might correspond to the value which can be obtained by determining the integral of the refractive index along the thickness of the coating. In the case of a discrete-layered coating with a uniform refractive index across each single layer, the integral might become a sum.

For example, the following equation may be used to determine the average refractive index of the coating $\bar{n}$ for a total thickness of the coating (especially measured along the first direction) being d and the local refractive index of the coating/its layers n(x):

$$\bar{n} = \int_0^d n(x)dx / \int_0^d dx.$$

For example, the refractive index of the coating may be regarded as matched to that of the substrate, if for the refractive index of the substrate $n_s$ the condition $\bar{n}=n_s$ is satisfied.

The refractive index of the coating optionally is a weighted average of the local refractive index over the coating thickness.

Optionally, the refractive index of the coating is identical to the refractive index of the substrate. The values of the refractive indexes optionally are identical if the ratio of the refractive index of the coating and the refractive index of the substrate is between 0.95 and 1.05.

Optionally the refractive index of the coating (and, if applicable of the substrate) is specified for a wavelength of 587 nm and/or for the specific wavelength.

In some embodiments, the coating has a refractive index corresponding to the refractive index of the substrate and/or wherein the ratio of the refractive index of the coating and the refractive index of the substrate is between 0.9 and 1.1.

This allows providing a soft transition for the specific light beam between the coating and the substrate which turned out to be particularly beneficial for improving the image quality.

Optionally the refractive index of the coating is an average refractive index of the coating.

In some embodiments, a thickness of the substrate along the first direction is larger than or equal to 0.1 mm, larger than or equal to 0.5 mm, larger than or equal to 0.7 mm, larger than or equal to 1.0 mm, or larger than or equal to 5.0 mm; and/or is smaller than or equal to 20.0 mm, smaller than or equal to 15.0 mm, smaller than or equal to 10.0 mm, smaller than or equal to 7.0 mm, or smaller than or equal to 5.0 mm; and/or is between 0.1 mm and 20.0 mm, between 0.5 mm and 10.0 mm, between 1.0 mm and 5.0 mm, between 2.0 mm and 4.0 mm, or between 2.0 mm and 3.0 mm.

Respective thicknesses can be produced with well-known techniques which might keep the manufacturing costs low.

In some embodiments, a refractive index of the substrate is 1.45 or larger, 1.47 or larger, 1.50 or larger, 1.51 or larger, or 1.60 or larger; and/or is 3.00 or smaller, 2.50 or smaller, 2.00 or smaller, or 1.80 or smaller.

Choosing a respective refractive index of the substrate turned out to be particularly beneficial for improving the image quality.

The term "refractive index" (of the substrate) as used herein may be defined as the indication of the light bending ability of the substrate.

For example, the values of the refractive index stated above for the substrate might correspond to the value which can be obtained by determining the integral of the refractive index along the thickness of the substrate material. In the case of a discrete-layered substrate with a uniform refractive index across each single layer, the integral might become a sum.

For example, the following equation may be used to determine the average refractive index of the substrate $\bar{n}$ for a total thickness of the substrate (especially measured along the first direction) being d and the local refractive index of the substrate n(x):

$$\bar{n} = \int_0^d n(x)dx / \int_0^d dx.$$

The refractive index of the substrate optionally is a weighted average of the local refractive index over the substrate thickness.

Optionally the refractive index is specified for a wavelength of 587 nm and/or for the specific wavelength.

Optionally the refractive index of the substrate is an average refractive index of the substrate.

In some embodiments it might be alternatively or in addition preferred that an Abbe number v d of the substrate is 15 or larger, 30 or larger, 40 or larger, 50 or larger, 70 or larger or 80 or larger; and/or is 95 or smaller, 80 or smaller, 70 or smaller, 50 or smaller, 40 or smaller, 30 or smaller or 20 or smaller; and/or is between 15 and 95, between 35 and 80 or between 40 and 70, such as 44 or 64.

Choosing a respective Abbe number of the substrate turned out to be particularly beneficial for improving the image quality.

Optionally the Abbe number $v_d$ of the substrate is an average Abbe number of the substrate.

In some embodiments it might be alternatively or in addition preferred that an absorption coefficient of the substrate is less than 0.4, less than 0.3, less than 0.2, less than 0.1, less than 0.05, less than 0.01, less than 0.005, or less than 0.001.

With a respective absorption coefficient also a plurality of partial beam splitters might be used in series without significant loss of intensity and, hence, keeping image quality high also under such conditions.

The term "absorption coefficient" as used herein may be defined as a measure for the exponential decay of intensity of a light beam, that is, the value of downward e-folding distance of the original intensity as the energy of the intensity passes through a unit (e.g. one meter) thickness of the substrate material, so that an attenuation coefficient of 1 $m^{-1}$ means that after passing through 1 meter, the radiation will be reduced by a factor of e to 1/e, and for material with a coefficient of 2 $m^{-1}$, it will be reduced by e squared, or to $1/e^2$.

Optionally the absorption coefficient of the substrate is specified for a wavelength of 587 nm and/or for the specific wavelength.

In some embodiments it might be alternatively or in addition preferred that the substrate is essentially cuboidal, in particular essentially plate-shaped.

A respective shaped substrate can be easily manufactured. For example, a wafer can be used which is coated with the coating and subsequently a plurality of partial beam splitter might be cut out from the coated wafer, wherein a portion of the wafer then represents the substrate.

In some embodiments it might be alternatively or in addition preferred that the substrate comprises glass, such as acid resistant and/or alkali resistant glass, especially glass of group 1 and 2 (according to ISO 719:1985), and/or untempered glass.

Glass may be particularly preferred because optical properties can precisely be controlled.

Using glass which has not been tempered (i.e. which has not been hardened) might be beneficial because otherwise the interfaces of the substrate might be polarizing.

In some embodiments it might be alternatively or in addition preferred that an absolute value of the difference of the refractive index of the substrate and the refractive index of the coating is 1.00 or smaller, 0.50 or smaller, 0.10 or smaller, 0.07 or smaller, 0.05 or smaller, 0.03 or smaller, 0.02 or smaller, 0.01 or smaller, 0.005 or smaller, 0.001 or smaller, or 0.0005 or smaller; and/or is 0.0001 or larger, 0.0002 or larger, 0.0003 or larger, or 0.0004 or larger.

A respective tuning of the values of the refractive index of the substrate and the coating may be advantageous to provide a partial beam splitter for high quality images.

Optionally the refractive index of the substrate and/or the coating is an average refractive index of the substrate and/or coating.

Optionally the two refractive indexes are specified for a wavelength of 587 nm and/or for the specific wavelength.

In some embodiments it might be alternatively or in addition preferred that a coating is arranged on each of the two main surfaces of the substrate, wherein optionally the two coatings are identical, in particular identically structured, especially starting from the substrate in each case.

A second coating may act as a stress compensating layer, compensating for the stress caused by the first coating.

If the two main surfaces of the substrate are coated, the phase difference is observed after the specific light beam has been transmitted through the first coating, the substrate and the second coating. Also, the value of the total thickness of the partial beam splitter accounts for the thicknesses of both coatings along with the thickness of the substrate.

Optionally the two coatings are different.

It surprisingly turned out that even two reflective beams can be created with a partial beam splitter if both sides of the substrate are coated in the proposed manner, especially if the two coatings are identical in their structure, while at the same time the phase can still be controlled in a precise manner. By coating both main surfaces of the substrate, the partial beam splitter optionally basically becomes a dual beam splitter in one piece.

The person skilled in the art understands that the two coatings are identically structured starting from the substrate in each case, especially if, when starting from the substrate in the first direction and in the opposite direction, the two coatings have the same structure, in particular the same layer sequence (especially with respect to material and/or thickness).

In some embodiments it might be alternatively or in addition preferred that the partial beam splitter is partially reflective and/or partially transmissive for the specific light beam incident thereon.

Optionally, the reflectance and transmittance of the partial beam splitter is controlled by the optical properties of the coating, the optical properties of the substrate and/or the combination between the two.

In some embodiments it might be alternatively or in addition preferred that the coating has a reflectance of at least 0.03 and/or at most 0.35; a transmittance of at least 0.65 and/or at most 0.97; and/or an absorbance of at least 0.001 and/or at most 0.01, in particular for light of the specific wavelength incident on the partial beam splitter, especially at an angle of 32° to the optical axis of the partial beam splitter, and/or for a value for the refractive index of $n_e$.

The respective values for the reflectance, transmittance and/or absorbance of the coating of the partial beam splitter turned out to be beneficial for providing a high-quality image.

Optionally the reflectance, transmittance and/or absorbance, respectively, of the coating is specified for a wavelength of 587 nm and/or for the specific wavelength.

In some embodiments the reflectance of the coating is between 0.03 and 0.09 or between 0.05 and 0.15 or between 0.1 and 0.25 or between 0.2 and 0.29. For example, the reflectance is between 0.03 and 0.29 or between 0.03 and 0.24.

In some embodiments for the reflectance R, the absorbance A and the transmittance T, respectively of the coating, the equation R+T+A=1 holds, wherein optionally the absorbance A is between 0.001 and 0.01, the reflectance R is between 0.03 and 0.35 and the transmittance T is between 0.65 and 0.97.

The absorbance may be obtained by measuring the reflectance R and the transmittance T and considering energy conservation, so that the relation A=1−R−T holds.

It is optionally possible to use the complex refractive index, n=nr+i*k (wavelength dependent). The values of the extinction coefficient k, like the values of n, are for example available in the databases of optical constants for the coating materials. The relation to the absorption coefficient α [1/m] is given by the following expression (at the vacuum wavelength $\lambda_0$):

$$\alpha = \frac{4\pi k}{\lambda_0}$$

It is optionally possible to determine A, R and T by programs for designing coating layers.

In some embodiments provided according to the invention, a stack comprises two or more partial beam splitters provided according to the invention, wherein optionally the partial beam splitters are arranged one above the other along a stacking direction, in particular with the stacking direction being parallel to the first direction and/or parallel to the optical axis of the partial beam splitters.

Such a stack may be particularly preferred for waveguides for applications in the field of augmented reality.

All the advantages and options that have been described with respect to the partial beam splitter provided according to the invention likewise apply to the stack provided according to the invention. Therefore, reference may be made herein to the previous explanations.

Optionally the substrates of the partial beam splitters are arranged relative to one another in such a way that the main surfaces of adjacent substrates face one another and/or are parallel to each other.

In some embodiments it might be alternatively or in addition preferred that the partial beam splitters following one another along the stacking direction or along a direction antiparallel to the stacking direction have a different, in particular increasing or decreasing, reflectivity and/or a different, in particular decreasing or increasing, transmittivity for the portion of the specific light beam incident on them respectively.

Surprisingly, it has been found that a corresponding configuration makes it possible to produce an image with uniform intensity over all parts of the image, even if the light beams contributing to the image pass through a different number of partial beam splitters.

In some embodiments it might be alternatively or in addition preferred that the specific light beam is guided and/or can be guided along the partial beam splitters within the stack.

For the person skilled in the art it is clear that along the propagation path of the specific light beam through the stack, the specific light beam is incident on the first partial beam splitter of the at least two partial beam splitters. Then, on each subsequent partial beam splitter of the at least two partial beam splitters the portion of the specific light beam transmitted at the respective previous partial beam splitter is incident.

For example, considering a stack with three partial beam splitters A, B and C (with partial beam splitter A on top, partial beam splitter C at the bottom and partial beam splitter B in between partial beam splitters A and B) and a specific light beam which is incident on the partial beam splitter A. Then the transmitted portion of the specific light beam is incident on partial beam splitter B. And the transmitted portion of the light beam which is incident on partial beam splitter B is incident on partial beam splitter C.

In some embodiments it might be alternatively or in addition preferred that at least two, or all, partial beam splitters are joined together by an adhesive, optical contacting and/or low temperature bonding (LTB).

The invention also provides a method of manufacturing a partial beam splitter. The method comprises providing a substrate and arranging at least one coating on at least one main surface of the substrate so as to obtain a partial beam splitter provided according to the invention.

It surprisingly turned out that manufacturing the partial beam splitter can easily be carried out in the described manner.

In some embodiments also the second main surface of the substrate is coated, especially with an identical coating as applied to the first main surface of the substrate. This second coating is optionally used for stress compensation.

Examples for Materials

In some embodiments, the following materials may be used for the coating of the substrate.

A coating having a matching layer comprising or consisting of $SiO_2$ and/or $Al_2O_3$ (especially for obtaining a refractive index of the coating of about 1.61 at 500 nm).

A coating having a matching layer made of $SiO_2$ (especially for obtaining a refractive index of the coating of about 1.52 at 500 nm).

A coating having at least one layer made of $Ta_2O_5$ and at least one layer made of $SiO_2$ (especially for obtaining a refractive index of the coating of about 1.50 at 500 nm).

A coating having at least one layer made of $Ta_2O_5$ and at least one layer made of $SiO_2$ and at least one layer made of $Al_2O_3$ and at least one layer, especially in the form of a matching layer, made of $SiO_2$ and/or $Al_2O_3$ (especially for obtaining a refractive index of the coating of about 1.6 at 500 nm).

A coating having at least one layer made of hafnium oxide and at least one layer made of $SiO_2$ (especially for obtaining a refractive index of the coating of about 1,516 at 587 nm).

A coating having at least one layer made of $Ta_2O_5$ and at least one layer made of $SiO_2$ (especially for obtaining a refractive index of the coating of about 1,516 at 587 nm).

Referring now to the drawings, FIG. 1A shows a partial beam splitter 1 which comprises a substrate 3 made of glass and a coating 5 which is applied on a first main surface 7 of the substrate 3. The coating 5 has three layers 9a, 9b and 9c which are made of different materials.

The refractive index of the coating 5 is adjusted in a precise manner by combining the three layers 9a, 9b and 9c having different refractive indexes to achieve a target refractive index of the coating. For example, layer 9a may have a low refractive index of 1.6 and layer 9b may have a high refractive index of 2.4 while layer 9c may have a refractive index of 2.1 so that the refractive index of the coating 5 may be 1.61. The layer 9a may be a matching layer which matches the refractive index of the substrate material of 1.61. By combining the different layers, the phase of an incident light beam can be controlled (especially via the matching layer) and at the same time reflectivity and transmittivity of the partial beam splitter can be defined by means of the other layers.

The substrate 3 has a thickness of $T_S$ along a first direction D1 which is parallel to the normal vector N of the first main surface 7 (and likewise parallel to the, in FIG. 1A not shown, normal vector of the coating 5). And the coating 5 has a thickness of $T_C$ along the first direction D1. The total thickness of the partial beam splitter 1 along the first direction D1 is $T_T$, which is the sum of $T_C$ and $T_S$.

In FIG. 1A a specific light beam 11 which is incident on the partial beam splitter 1 is shown. The direction of the specific light beam is illustrated by means of an arrow. The angle of incident, which is the angle $\alpha$ between a vector parallel to the first direction D1, such as the normal vector N of the first main surface 7, and a vector parallel to the specific light beam 11 is 32°. The specific wavelength of the specific light beam 11 is 525 nm. Actually, the specific light beam propagates within a prism 13 which is closely attached to the partial beam splitter 1. The prism 13 works as coupling element so that the specific light beam 11 can be coupled into the partial beam splitter 1.

A portion of the specific light beam 11 is reflected by the partial beam splitter 1 so that a reflected partial light beam 15 is created. Another portion of the specific light beam 11 is transmitted through the partial beam splitter 1 so that a transmitted partial light beam 17 is created.

An illustration of the propagation path of the specific light beam 11 within the partial beam splitter 1, i.e. within the coating 5 and the substrate 3, is shown as a dashed line.

The transmitted portion of the specific light beam 11, i.e. partial light beam 17, leaves the partial beam splitter 1 at an exit point 19 which is on the second main surface 21 of substrate 3 and which second main surface 21 points in an opposite direction than the first main surface 7.

Figure 1B:
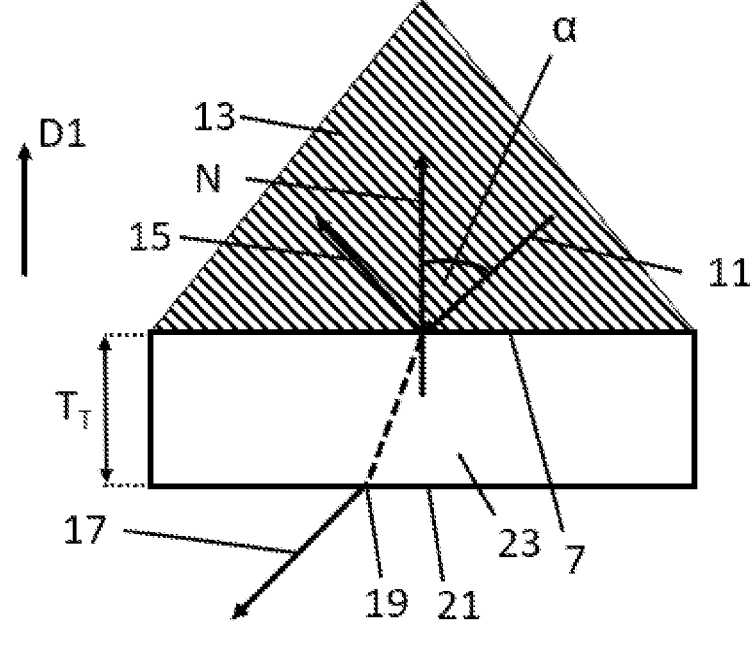
FIG. 1B shows a schematic drawing of a reference substrate under otherwise identical conditions as shown in FIG. 1B.

FIG. 1B shows an identical setup as that shown in FIG. 1A, wherein same features are labeled with same reference signs. However, the partial beam splitter 1 has been replaced by a reference substrate 23 which is identical to substrate 3 but has a thickness of $T_T$ along the first direction D1. In other words, the reference substrate 23 has a thickness which is identical to the total thickness of the partial beam splitter 1 of FIG. 1A.

If the phase of the transmitted partial light beam 17 in FIG. 1A is compared to the phase of the transmitted partial light beam 17 in FIG. 1B, (in both scenarios at the respective exit point 19) then there can be evaluated a phase difference which has an absolute value of smaller than 30°.

This allows using the partial beam splitter 1 optionally in augmented reality applications because the phase difference can be limited and reflectivity/transmittivity can also be defined as described above.

Figure 2A:
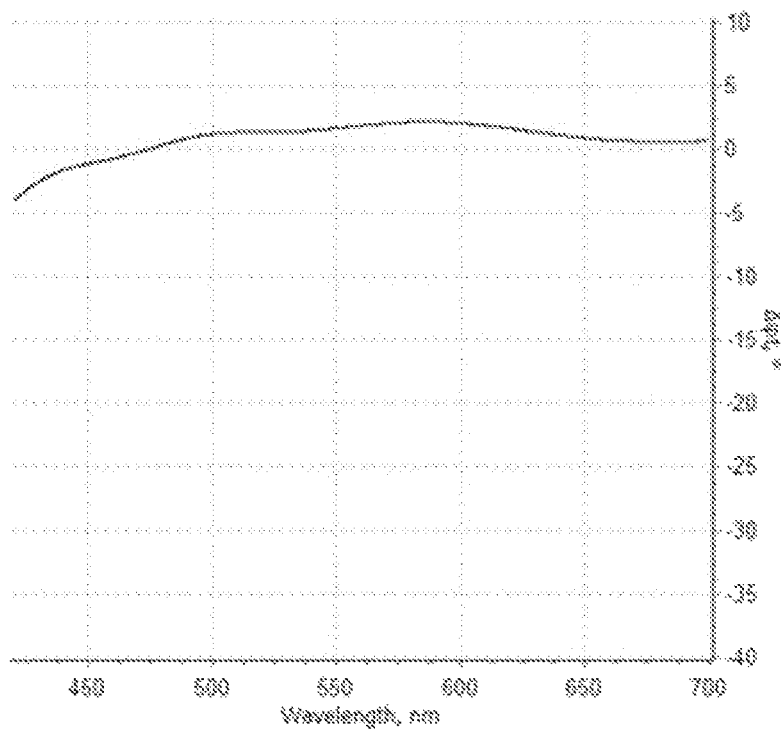
FIG. 2A shows a diagram with the phase differences for different wavelengths evaluated for a partial beam splitter provided according to the invention.

FIG. 2A shows a diagram with the phase differences for different wavelengths evaluated for a partial beam splitter. The partial beam splitter used here for the evaluation is a partial beam splitter according to the first aspect of the invention and has a coating with 17 layers and a total thickness of 1354.75 nm. The coating has the following layers (wherein layer 1 is arranged on the substrate and layers 2 to 17 follow along the first direction):

| Layer # | Material | Thickness [nm] |
|---|---|---|
| 1 | $SiO_2$ | 101.207 |
| 2 | $Ta_2O_5$ | 7.683 |
| 3 | $SiO_2$ | 158.819 |
| 4 | $Ta_2O_5$ | 6.289 |
| 5 | $SiO_2$ | 146.306 |
| 6 | $Ta_2O_5$ | 8.698 |
| 7 | $SiO_2$ | 201.482 |
| 8 | $Ta_2O_5$ | 11.865 |
| 9 | $SiO_2$ | 221.318 |
| 10 | $Ta_2O_5$ | 11.511 |
| 11 | $SiO_2$ | 222.927 |
| 12 | $Ta_2O_5$ | 8.404 |
| 13 | $SiO_2$ | 81.567 |
| 14 | $Ta_2O_5$ | 4.774 |
| 15 | $SiO_2$ | 119.399 |
| 16 | $Ta_2O_5$ | 4.774 |
| 17 | $SiO_2$ | 37.727 |

The (average) refractive index of the coating is 1.5151.

The substrate here is a boron-containing crown glass with a refractive index at 587 nm of 1.5167.

As can be taken from the diagram, the phase shift of the transmitted beam has an absolute value which is 30° or smaller for all wavelengths in the range from 450 nm to 650 nm.

Figure 2B:
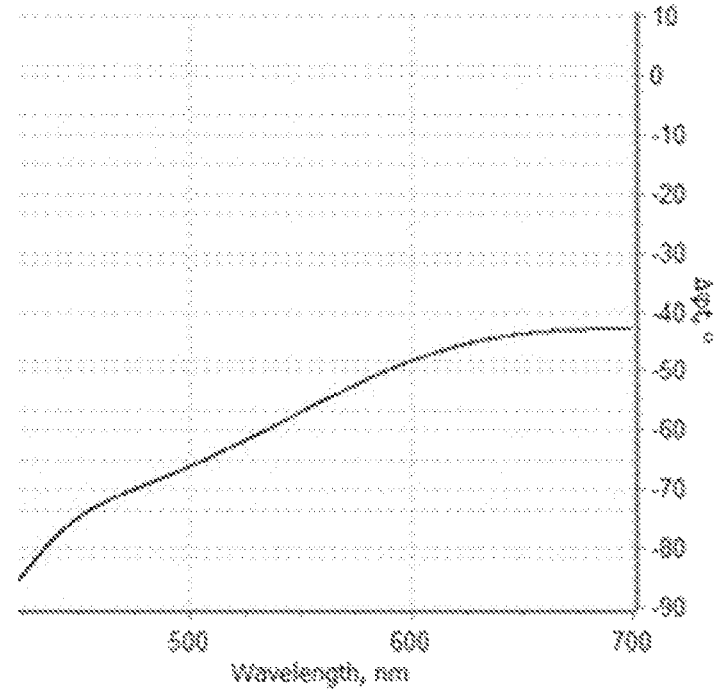
FIG. 2B shows a diagram with the phase differences for different wavelengths evaluated for a conventional partial beam splitter.

FIG. 2B shows a diagram with the phase differences for different wavelengths evaluated for a conventional partial beam splitter.

The partial beam splitter used here for the evaluation has a coating with 9 layers and a total thickness of 718.038 nm. The coating has the following layers (wherein layer 1 is arranged on the substrate and layers 2 to 9 follow along the first direction):

| Layer # | Material | Thickness [nm] |
|---------|----------|----------------|
| 1 | $HfO_2$ | 7.169 |
| 2 | $SiO_2$ | 215.050 |
| 3 | $HfO_2$ | 17.482 |
| 4 | $SiO_2$ | 193.784 |
| 5 | $HfO_2$ | 17.008 |
| 6 | $SiO_2$ | 135.725 |
| 7 | $HfO_2$ | 7.442 |
| 8 | $SiO_2$ | 116.194 |
| 9 | $HfO_2$ | 8.184 |

The (average) refractive index of the coating is 1.5310.

The substrate here is a boron-containing crown glass with a refractive index at 587 nm of 1.5167.

As can be taken from the diagram in FIG. 2B, the phase shift of the transmitted beam has an absolute value which is larger than 30° for all wavelengths in the range from 450 nm to 650 nm.

Figure 3:
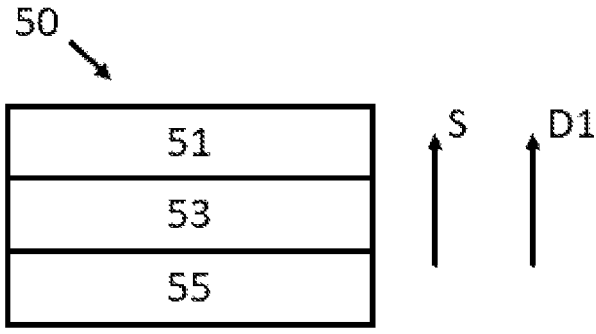
FIG. 3 is a schematic illustration of a stack provided according to the invention.

FIG. 3 shows a stack 50 provided according to the invention. Stack 50 comprises three partial beam splitters 51, 53 and 55 provided according to the invention. The partial beam splitters 51, 53 and 55 might at least partly or entirely be realized in form of the partial beam splitter 1 described above with reference to FIGS. 1A and 1B.

The partial beam splitters 51, 53 and 55 are arranged one above the other along a stacking direction S, wherein the stacking direction is parallel to the first direction D1.

Figure 4:
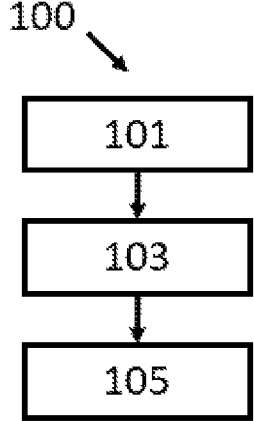
FIG. 4 is a flowchart of a method provided according to the invention.

FIG. 4 shows a flowchart 100 of a method provided according to the invention.

In 101 a substrate (e.g. substrate 1) is provided. In 103 a coating (e.g. coating 5) is arranged on one of the main surfaces (e.g. first main surface 7) of the substrate. In 105 a partial beam splitter provided according to the invention (e.g. partial beam splitter 1) is obtained.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Partial beam splitter
3 Substrate
5 Coating

7 First main surface
9a, 9b, 9c Layer
11 Specific light beam
13 Prism
15 Reflected partial light beam
17 Transmitted partial light beam
19 Exit point
21 Second main surface
23 Reference Substrate
50 Stack
51 Partial beam splitter
53 Partial beam splitter
55 Partial beam splitter
100 Flowchart
101 Providing a substrate
103 Arranging a coating on the substrate
105 Obtaining a partial beam splitter
α Angle
D1 First direction
N Normal vector
S Stacking direction
$T_C$ Thickness
$T_S$ Thickness
$T_T$ Thickness

What is claimed is:

1. A partial beam splitter, comprising:
a substrate made of a substrate material; and
at least one coating arranged on at least one main surface of the substrate, wherein along a first direction which is parallel to a normal vector of the main surface, the substrate and all coatings having a total thickness, and wherein for a specific light beam having a specific wavelength within a range of 450 nm and 650 nm which is incident on the partial beam splitter along a second direction with an angle of 32° enclosed between a vector pointing in the first direction and a vector pointing in said second direction, the specific light beam after transmitting through the partial beam splitter has a phase difference with an absolute value that is smaller than or equal to 30° compared to the case in which another light beam having the specific wavelength is incident on a reference substrate along another second direction with another angle of 32°, the other angle being enclosed between a vector pointing in a first direction that is parallel to a normal vector of a main surface of the reference substrate and a vector pointing in the other second direction, the reference substrate being made of the substrate material and having a thickness identical to the total thickness of the partial beam splitter.

2. The partial beam splitter of claim 1, wherein the specific wavelength is between 500 nm and 600 nm.

3. The partial beam splitter of claim 1, wherein the phase difference has an absolute value which is smaller than or equal to 20° and/or is larger than or equal to 0.5°.

4. The partial beam splitter of claim 1, wherein the at least one coating has at least two layers and/or between 1 and 5000 layers.

5. The partial beam splitter of claim 1, wherein a thickness of each layer of the at least one coating along the first direction is larger than or equal to 1 nm and/or is smaller than or equal to 5000 nm.

6. The partial beam splitter of claim 1, wherein at least one layer of the at least one coating is a dielectric layer and/or at least one layer of the at least one coating consists of and/or comprises metal and/or the at least one coating has no layers made of and/or comprising metal.

7. The partial beam splitter of claim 1, wherein the at least one coating has at least one spatially variable index layer or is made of one single spatially variable index layer.

8. The partial beam splitter of claim 1, wherein the at least one coating is at least partially applied to the substrate by sputtering.

9. The partial beam splitter of claim 1, wherein at least one layer of the at least one coating constitutes a matching layer.

10. The partial beam splitter of claim 9, wherein the matching layer comprises or consists of
a. one or more components selected from the group consisting of one or more oxides, one or more fluorides, one or more nitrides, one or more sulfides, one or more selenides, one or more metals, and combinations of two or more thereof; and/or
b. one or more components selected from the group consisting of one or more metal oxides, one or more metal fluorides, one or more metal nitrides, one or more metal sulfides, one or more metal selenides, and combinations of two or more thereof.

11. The partial beam splitter of claim 10, wherein
a. the one or more oxides is selected from the group consisting of silicon oxide, aluminum oxide, hafnium oxide, tantalum oxide, niobium oxide, titanium oxide, zirconium oxide, yttrium oxide, praseodymium oxide, scandium oxide, tin oxide, chromium oxide, indium oxide, and combinations of two or more thereof;
b. the one or more fluorides is selected from the group consisting of aluminum fluoride, magnesium fluoride, neodymium fluoride, lanthanum fluoride, yttrium fluoride, gadolinium fluoride, ytterbium fluoride, and combinations of two or more thereof;
c. the one or more nitrides is selected from the group consisting of aluminum nitride, silicon nitride, and combinations thereof;
d. the sulfide is zinc sulfide;
e. the selenide is zinc selenide; and/or
f. the metal is selected from the group consisting of aluminum, silver, gold, chromium, nickel, and combinations thereof.

12. The partial beam splitter of claim 1, wherein a thickness of the at least one coating along the first direction is larger than or equal to 500 nm and/or is smaller than or equal to 3000 nm.

13. The partial beam splitter of claim 1, wherein a refractive index of the at least one coating is 1.45 or larger and/or is 3.00 or smaller.

14. The partial beam splitter of claim 1, wherein the at least one coating has a refractive index corresponding to a refractive index of the substrate and/or wherein a ratio of the refractive index of the at least one coating and the refractive index of the substrate is between 0.9 and 1.1.

15. The partial beam splitter of claim 1, wherein a thickness of the substrate along the first direction is larger than or equal to 0.1 mm and/or is smaller than or equal to 20.0 mm.

16. The partial beam splitter of claim 1, wherein a refractive index of the substrate is 1.45 or larger and/or is 3.00 or smaller.

17. The partial beam splitter of claim 1, wherein an Abbe number of the substrate is 15 or larger and/or is 95 or smaller.

18. The partial beam splitter of claim 1, wherein an absorption coefficient of the substrate is less than 0.4.

19. The partial beam splitter of claim 1, wherein the substrate is cuboidal.

20. The partial beam splitter of claim 1, wherein the substrate comprises glass.

21. The partial beam splitter of claim 1, wherein an absolute value of a difference of a refractive index of the substrate and a refractive index of the at least one coating is 1.00 or smaller and/or is 0.0001 or larger.

22. A stack, comprising:
two or more partial beam splitters, each of the partial beam splitters comprising:
a substrate made of a substrate material; and
at least one coating arranged on at least one main surface of the substrate, wherein along a first direction which is parallel to a normal vector of the main surface, the substrate and all coatings having a total thickness, and wherein for a specific light beam having a specific wavelength within a range of 450 nm and 650 nm which is incident on the partial beam splitter along a second direction with an angle of 32° enclosed between a vector pointing in the first direction and a vector pointing in said second direction, the specific light beam after transmitting through the partial beam splitter has a phase difference with an absolute value that is smaller than or equal to 30° compared to the case in which another light beam having the specific wavelength is incident on a reference substrate along another second direction with another angle of 32°, the other angle being enclosed between a vector pointing in a first direction that is parallel to a normal vector of a main surface of the reference substrate and a vector pointing in the other second direction, the reference substrate being made of the substrate material and having a thickness identical to the total thickness of the partial beam splitter.

23. The stack of claim 22, wherein the partial beam splitters are arranged one above the other along a stacking direction with the stacking direction being parallel to the first direction and/or parallel to an optical axis of the partial beam splitters.

24. The stack of claim 23, wherein the partial beam splitters follow one another along the stacking direction or along a direction antiparallel to the stacking direction and have a different reflectivity and/or a different transmittivity for a portion of the specific light beam incident on them respectively.

* * * * *